UNITED STATES PATENT OFFICE.

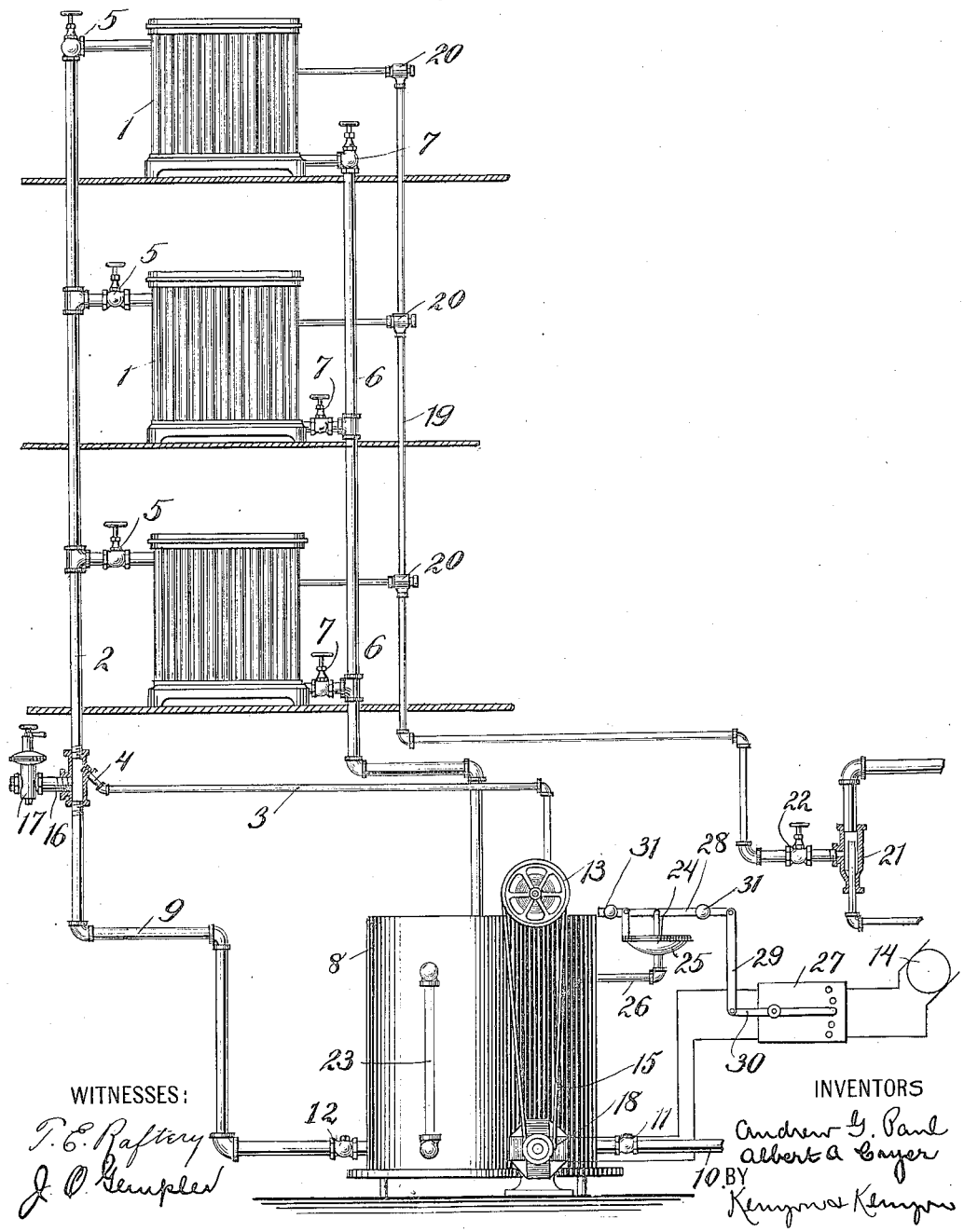

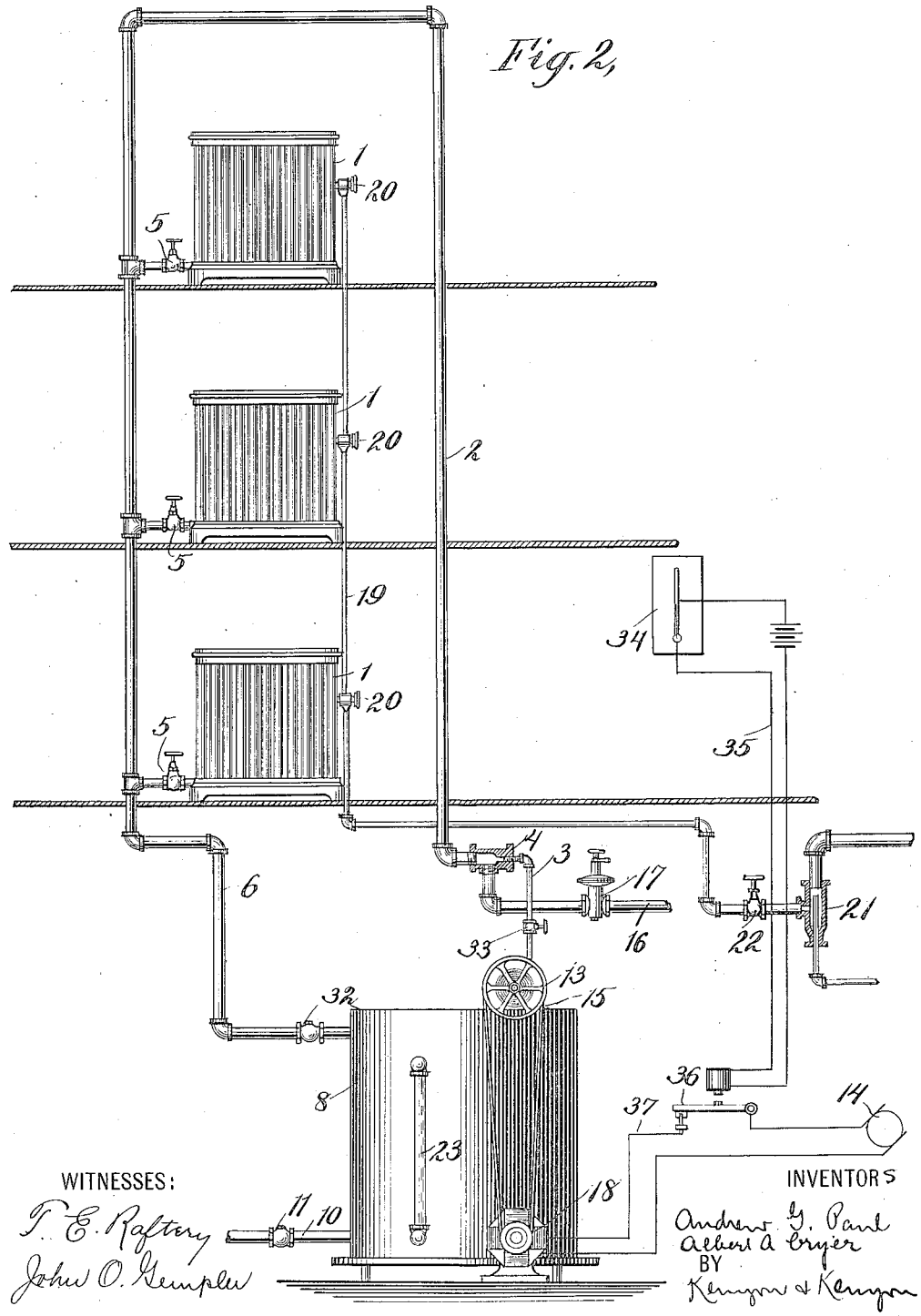

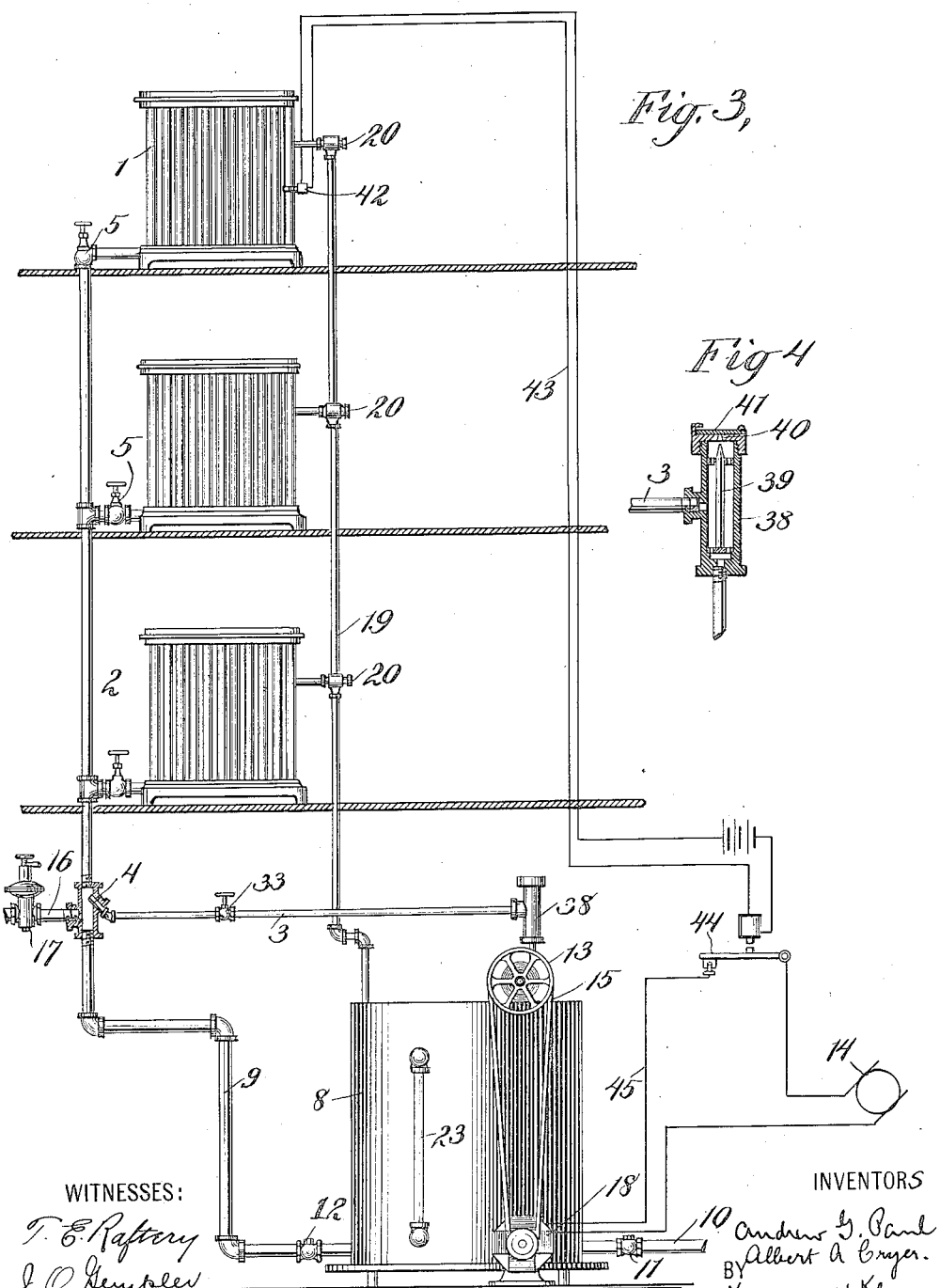

ANDREW G. PAUL, OF BOSTON, MASSACHUSETTS, AND ALBERT A. CRYER, OF NEWARK, NEW JERSEY; SAID CRYER ASSIGNOR TO SAID PAUL.

HEATING SYSTEM.

1,045,606.           Specification of Letters Patent.           Patented Nov. 26, 1912.

Application filed April 16, 1901. Serial No. 56,060.

*To all whom it may concern:*

Be it known that we, ANDREW G. PAUL and ALBERT A. CRYER, citizens of the United States, the former a resident of Boston, in the county of Suffolk and State of Massachusetts, and the latter a resident of Newark, county of Essex, State of New Jersey, have invented a new and useful Improvement in Heating Systems, of which the following is a specification, reference being had to the accompanying drawings, which form a part hereof.

This invention relates to a heating system wherein steam or other suitable heating agent is circulated for the purpose of conveying and imparting heat to the places desired, and it consists in an improved construction and arrangement of the parts of such a system.

The object of our invention is to secure the circulation in a heating system of the same heating vehicle continuously so as to use the said heating vehicle or a portion thereof, over and over again, and at the same time to produce a positive and efficient circulation and to control or regulate the amount of heating vehicle which is employed in this manner in the system, so as to accurately and easily control the amount of heating work which is done by the system.

To this end our invention consists first in the combination in a steam or vapor heating system, of a heater or radiator, a supply pipe, a return pipe, a tank with which both pipes are connected, a motor of any suitable construction for circulating the heating vehicle around the system, the said motor being in communication with the supply pipe so as to cause the heating vehicle or a part thereof to pass from the tank into the supply pipe again and so through the system, the said system being closed or sealed so as to prevent the escape of the heating vapor.

Our invention also consists in combining with the parts above enumerated, a supply main connected with the system and leading from any suitable generator or source of supply, and in providing this main with a controlling device. In the best form of our invention we employ a reducing valve on this supply main, which operates to maintain the pressure in the system at any point that may be desired.

Our invention also consists in providing the supply pipe with an air valve, preferably a thermostatic air valve, so arranged with reference to the motor that the air can be discharged from the system through this air valve by means of the motor whenever air collects in the system to any substantial extent.

Our invention also consists in combining with some or all of the features above enumerated, an air pipe and one or more automatic valves on the air pipe, and also an exhausting device with which the air pipe is connected.

Our invention also consists in combining with some or all of the features above enumerated, means connected in some way with the system and with the motor, the said means being adapted to control the operation of the motor whereby the action of the motor is regulated according to the needs or requirements of the system. In the best form of our invention the said motor is controlled by means of a thermostat which is adapted to be operated by the heat given off from the system.

Our invention also consists in certain other features of construction and combinations of parts hereinafter described and claimed.

Our invention is fully illustrated in the accompanying drawings, in which—

Figure 1 shows our invention applied to a system having three radiators and provided with separate return pipe and air pipe; Fig. 2 shows our invention applied to a system containing three radiators which are arranged according to what is ordinarily known as the one pipe overhead system; Fig. 3 shows our invention applied to a system having three radiators and arranged according to the up-feed one-pipe system; Fig. 4 is a detail sectional view of the air valve on the supply pipe.

Similar numbers denote similar parts in the different figures.

Referring to Fig. 1, 1, 1 are radiators of any suitable form; 2 is the supply pipe; 3 is a portion of the supply pipe leading from the motor to the pipe 2; the pipe 3 where it connects with the pipe 2 is provided with any suitable form of jet or induction fitting 4. This jet is so arranged as to cause an upward current of the heating vehicle in the supply pipe; 5, 5 are suitable supply valves on the branches of the supply pipe; 6 is the discharge or return pipe which is connected by suitable branches with the different radiators, and these radiators are provided with suitable valves 7. The return pipe 6 is connected at its lower end with the tank or reservoir 8 for the water of condensation. The supply pipe 2 is provided with a suitable drip pipe 9 which is connected with the lower part of the tank or reservoir 8. The tank 8 is also provided with a suitable outlet pipe 10 through which the water of condensation may be removed from the tank if desired. 11 is a valve of any suitable form on the pipe 10, preferably a check valve. The drip pipe 9 is also provided with any suitable form of valve 12, preferably a check valve. 13 is a motor of any suitable construction. In the best form of our invention we use a mechanical motor such as a rotary pump. This mechanical motor is driven by any suitable means such as a dynamo 14 operating through an electric motor 18, or by any other suitable prime mover. 15 is a belt connecting the engine or prime mover with the motor 13. The motor 13 is placed in, or suitably connected with, the pipe 3, which forms a part of the supply pipe or supply side of the system. Pipe 3 is connected on the lower side of the motor 13 with the tank 8. The motor is so arranged that when it is put in operation it causes the heating vehicle to flow from the tank 8 through the pipe 3 and the supply pipe 2, and thus to circulate through the system. 16 is a supply main leading from a suitable generator or other source of heating vehicle and connecting with the supply pipe 2. The pipe 16 is provided with a controlling device in the form of a reducing valve 17. This reducing valve can be so regulated as to control the admission of any additional supply of heating vehicle to the system, and thus to control and regulate the operation of the system. 19 is an air pipe having suitable branches connecting with each radiator and provided with automatic air valves 20. 21 is an exhausting device which is connected with the air pipe and which may be of any suitable form. We prefer to use a jet of steam or water. 22 is any suitable form of shut-off valve by means of which the exhausting device can be cut out of operation or its operation can be regulated. 23 is a gage on the tank 8 by means of which the condition of the heating vehicle in the tank is indicated. 24 is a fluid pressure motor preferably in the form of a diaphragm. 25 is a fluid pressure chamber below the diaphragm connected with the tank 8 by means of the pipe 26. The diaphragm 24 is connected with a rheostat or other regulating device 27 for shutting off or regulating the dynamo 14 in the well known manner. The diaphragm 24 is connected with the rheostat 27 by means of the lever 28, the link 29 and the pivoted lever 30. The parts are so arranged that when the pressure in the tank 8 is increased to the predetermined point, the diaphragm 24, through the levers, links and rheostat, shuts off the dynamo 14 entirely. As the pressure in the tank 8 varies below this point, the dynamo is cut off more or less. 31, 31 are weights on the lever 28 by means of which the operation of the diaphragm can be regulated. The operation of this form of our invention is as follows: Assuming that steam is to be used as the heating vehicle, the controlling device 17 having been properly set or regulated to control the supply of steam to the system, steam enters the system through the said device and, the motor 13 being in operation, the steam is forced through the supply pipe 2 into one or more of the radiators. As the steam condenses in the radiators the water of condensation, with more or less steam or vapor, flows through the discharge pipe 6 down into the tank 8. Any steam that condenses in the supply pipe 2 flows into the tank 8 through the drip pipe 9. The motor 13 operates to cause the heating vehicle which passes into the tank 8, to again flow through the pipe 3 into the supply pipe 2, and thus to circulate again in or through the system. If by reason of the operation of the motor 13 the pressure in the tank 8 is reduced sufficiently, the water of condensation escaping into the tank 8 is reëvaporated and again circulated through the system. The air is removed from the radiators through the air pipe 19 by means of the exhausting device 21, the thermostatic air valves 20 operating to prevent the waste of steam. In this manner the heating vehicle or a portion thereof, is circulated in or through the system continuously so as to use the heating vehicle or a portion thereof over and over again. Should the pressure on the supply side of the system fall below the point desired, the reducing valve 17 operates to admit an additional supply of steam, thereby regulating the operation of the system. Should the pressure in the tank 8 be increased so as to rise above the desired point, the diaphragm 24 is raised and thus acts to reduce or shut off the power and thereby to decrease the speed of the motor 13 or shut it off entirely. The operation of the system is thereby automatically and at the same time very evenly and accurately controlled. It will be apparent that the position of the motor 13 in the system could be greatly varied. It is also apparent that the controlling device for controlling the motor 13 may be connected with many other parts of the system than the tank 8.

Referring to Fig. 2, the parts are the same as already explained in connection with Fig. 1 with the following differences: In this form of the invention the system is arranged according to the one-pipe overhead supply plan. 6 is a pipe for the return of the heating vehicle to the tank 8, this return pipe being connected with the lower end of the down feed riser 2. 32 is a suitable valve, preferably a check valve, in the pipe 6. 33 is a shut-off valve in the pipe 3. 34 is a thermostat adapted to be placed in the room to be heated or in any other suitable position, to control the operation of the dynamo 14 by any suitable connections. We prefer to employ an electric circuit 35 including battery and an electro-magnet, the electro-magnet operating a make-and-break device 36 in the circuit 37 connecting the dynamo with the electric motor 18. The operation of this form of our invention is substantially the same as already explained, except that the operation of the mechanical motor 13 is controlled by the thermostat 34. When the thermostat 34 is heated to the predetermined point, it operates to break the circuit 37 and thus to stop the electric motor 18 and hence the motor 13.

Referring to Figs. 3 and 4, the parts are the same as already described with the following differences: The air pipe 19 is connected with the tank 8 instead of being connected with a separate exhausting device. 38 is an automatic air valve in the pipe 3 which is designed to permit the air to be discharged from the system. The construction of this air valve is shown in detail in Fig. 4. It is a thermostatic valve. 39 is the expanding member which can be made of any suitable material. It is supported within the valve 38 and is adapted to close the discharge port 40 when it is expanded. 41 is a check valve which is adapted to prevent the entrance of air into the system. The valve 38 is preferably placed upon the pipe 3 immediately above the mechanical motor 13, as shown in the drawing. When the air is caused to flow through the valve 38 by the motor 13, it cools the member 39, thereby opening the port 40, and as the direction of the current passing from the motor 13 is toward the discharge port 40, the air passes out of said port instead of passing through the pipe 3. This discharge of the air from the system may be made more certain and complete by closing the valve 33 on the pipe 3 until the air is removed from the system. 42 is a thermostat which in the form shown is adapted to be placed in contact with or in proximity to any part of the heating system. This thermostat is connected with the electric motor 18 in any suitable way so as to control its operation. We prefer to employ an electric circuit 43 including battery and electromagnet, the electromagnet operating a make-and-break device 44 in the circuit 45 connecting the dynamo and the electric motor. Any other suitable connecting means may be employed for this purpose. The operation of this form of our invention is the same as already explained except that the air which passes through the pipe 19 flows into the tank 8 and is caused to flow from the said tank through the pipe 3 by the motor 13. When the thermostatic valve 38 is open, the air can be expelled from the system. The best method of starting the system is to close the valve 33. The motor 13 being in operation, the air will be drawn from the system by said motor and expelled through the valve 38. Assuming that steam is used as a heating vehicle, the steam will enter the system and flow through the same. When the steam reaches the valve 38, this valve will be closed. If the valve 33 is then opened, the steam will be circulated through the pipes 3 and 2 in the manner already explained. In this system, however, the water of condensation flows back through the pipe 2 and through the return pipe 9 into the tank 8. When the pressure in the tank 8 is decreased sufficiently the water is reëvaporated, and the vapor or steam is caused to circulate through the system again by the motor 13. The thermostat 42 can be placed against any part of the system, and when it is heated to a predetermined point it operates to break the circuit 45 and thereby shut off the motor 13. When the thermostat 42 cools sufficiently the motor 13 is again set in operation.

It is obvious that our improved heating system may be used for drying purposes.

Some of the advantages resulting from our invention are as follows: The system secures great economy as the heating vehicle, or a portion of it, is circulated again and again through the system or a part thereof, irrespective of the pressure in the supply main. The circulation is positive and efficient and easily controlled according to the work which is being done by the system or the requirements of the system. The supply of heating vehicle in the system or the pressure of the same, is automatically regulated by means of the controlling device on the supply main.

What we claim as new and desire to secure by Letters Patent, is:

1. In a vapor heating system, the combination of a heater or radiator, a supply-pipe, a return-pipe, a tank for the water of condensation condensed in the radiator, with which tank both pipes are connected, a motor adapted to circulate the heating vehicle through the system without changing the quantity thereof, said motor being in communication with the supply-pipe, the said system being closed or sealed so as to prevent the escape of heating vapor, a source of steam supply for supplying steam to the system, and means for controlling the supply of steam to the said system, substantially as set forth.

2. In a vapor heating system, the combination of a heater or radiator, a supply pipe, a return pipe, a tank for the water of condensation condensed in the radiator, said pipes being connected with said tank, the supply pipe being connected with said tank above the point where the water of condensation collects, a motor in communication with said supply pipe adapted to circulate the heating vehicle around the system without changing the quantity thereof, means for driving said motor, the system being closed or sealed, so as to prevent the escape of the heating vapor, a source of steam supply for supplying steam to said system, and means for controlling the supply of steam to said system.

3. In a vapor heating system, the combination of a heater or radiator, a supply pipe, a return pipe, a tank for the water of condensation condensed in the radiator, the supply pipe and the return pipe being connected with said tank above the point where the water of condensation collects, a motor in communication with said supply pipe adapted to circulate the heating vehicle through the system without changing the quantity thereof, means for driving said motor, the system being closed or sealed so as to prevent the escape of the heating vapor, a source of steam supply for supplying steam to said system, and means for controlling the supply of steam to said system, substantially as set forth.

4. In a vapor heating system, the combination of a heater or radiator, a supply pipe, a return pipe, a motor for circulating the heating vehicle through the system, in communication with the supply pipe and with the return pipe, an air pipe connected with the system, and one or more automatic air valves in the air pipe, and an exhausting device with which the air pipe is connected, the said system being closed or sealed so as to prevent the escape of the heating vapor, a supply main connected with the system, and a controlling device in the supply main, substantially as set forth.

5. In a vapor heating system, the combination of a heater or radiator, a supply pipe, a return pipe, a motor for circulating the heating vehicle through the system, in communication with the supply pipe and with the return pipe, an air pipe connected with the system, and one or more automatic air valves in the air pipe, and an exhausting device with which the air pipe is connected, the said system being closed or sealed so as to prevent the escape of the heating vapor, a supply main connected with the system, and a reducing valve in the supply main, substantially as set forth.

6. In a vapor heating system, the combination of a heater or radiator, a supply pipe, a return pipe, a tank with which both pipes are connected, a motor for circulating the heating vehicle through the system, in communication with the supply pipe, the said system being closed or sealed so as to prevent the escape of the heating vapor, and a supply main connected with the system, and a controlling device in the supply main, and means connected with the system for controlling the motor according to the requirements of the system, substantially as set forth.

7. In a vapor heating system, the combination of a heater or radiator, a supply pipe, a return pipe, a tank with which both pipes are connected, a motor for circulating the heating vehicle through the system, in communication with the supply pipe, a supply main connected with the system for supplying the heating vehicle thereto, the said system being closed or sealed so as to prevent the escape of the heating vapor and a thermostat adapted to be operated by the heat given off from the system and to control the motor, substantially as set forth.

8. In a vapor heating system, the combination of a heater or radiator, a supply pipe, a return pipe, a tank for the water of condensation condensed in the radiator with which tank both pipes are connected, a rotary pump for circulating the heating vehicle through the system in communication with the supply pipe, the said system being closed or sealed so as to prevent the escape of the heating vapor, a source of steam supply for supplying steam to the system, and means for controlling the supply of steam to the said system, substantially as set forth.

9. In a vapor heating system, the combination of a heater or radiator, a supply pipe, a return pipe, a tank for the water of condensation condensed in the radiator, the supply pipe being connected with said tank above the point where the water of condensation collects, a rotary pump in communication with said supply pipe adapted to circulate the heating vehicle through the system without changing the quantity thereof, the system being closed or sealed so as to prevent the escape of the heating vapor, a source of steam supply and means for controlling the supply of steam to said system.

10. In a vapor heating system, the combination of a heater or radiator, a supply pipe, a return pipe, a tank for the water of condensation condensed in the radiator, the supply pipe and the return pipe being connected with said tank above the point where the water of condensation collects, a rotary pump in communication with said supply pipe adapted to circulate the heating vehicle through the system without changing the quantity thereof, the system being closed or sealed so as to prevent the escape of the heating vapor, a source of steam supply, and means for controlling the supply of steam to said system, substantially as set forth.

In testimony whereof, we have signed our names to this specification, in the presence of two subscribing witnesses.

ANDREW G. PAUL.
ALBERT A. CRYER.

Witnesses:
 PENNINGTON HALSTED,
 EDWIN SEGER.